United States Patent [19]
Ruhl

[11] 4,171,030
[45] Oct. 16, 1979

[54] ACCELERATION WARNING DEVICE

[76] Inventor: Hermann Ruhl, 30 Queen Elizabeth Blvd., Toronto, Ontario, Canada, M8Z 2T6

[21] Appl. No.: 868,199

[22] Filed: Jan. 9, 1978

[51] Int. Cl.² .................................................. G08B 19/00
[52] U.S. Cl. ................................. 180/179; 340/62
[58] Field of Search ............... 180/105 R, 105 E, 106, 180/110; 340/52 R, 62

[56] References Cited
U.S. PATENT DOCUMENTS 3,997,869 12/1976 Mayer .................... 180/106 X
4,093,939 6/1978 Mitchell .................... 180/106 X Primary Examiner—Joseph F. Peters, Jr.
Assistant Examiner—Michael Mar

[57] ABSTRACT

An acceleration warning system for motor driven vehicles. The system includes speed measuring apparatus providing an output to a differentiating circuit for determining the rate of change of vehicle acceleration, and means responsive to a predetermined output of the differentiating circuit for indicating when the acceleration of the vehicle is beyond a predetermined rate. The system may also include control means for automatically limiting the acceleration of the vehicle.

10 Claims, 2 Drawing Figures

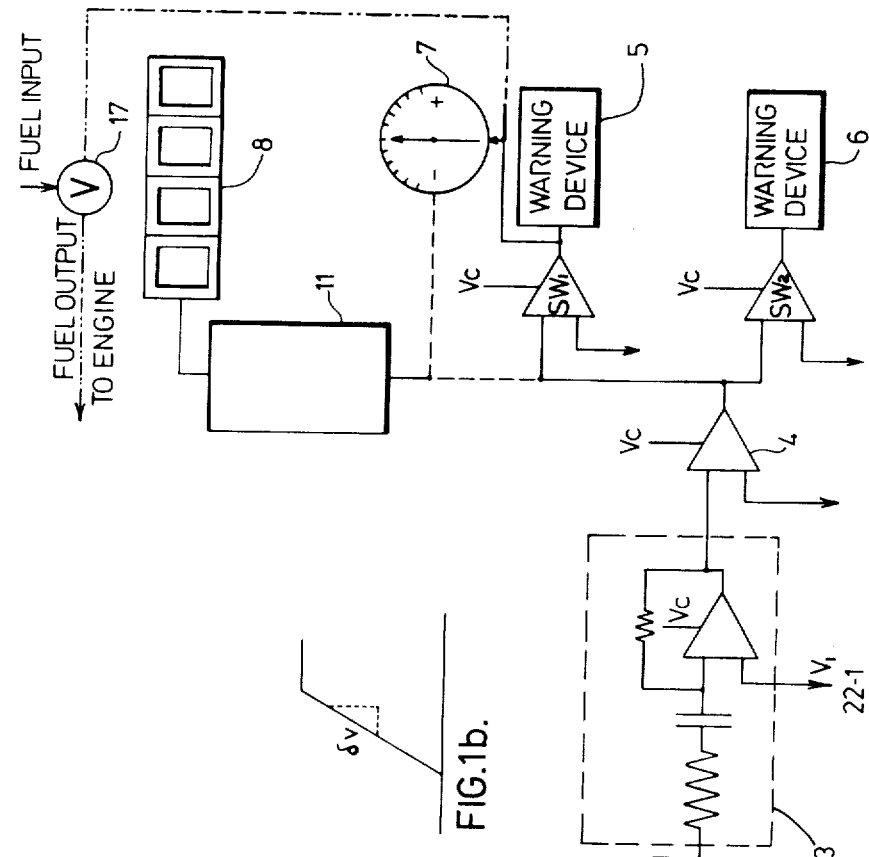
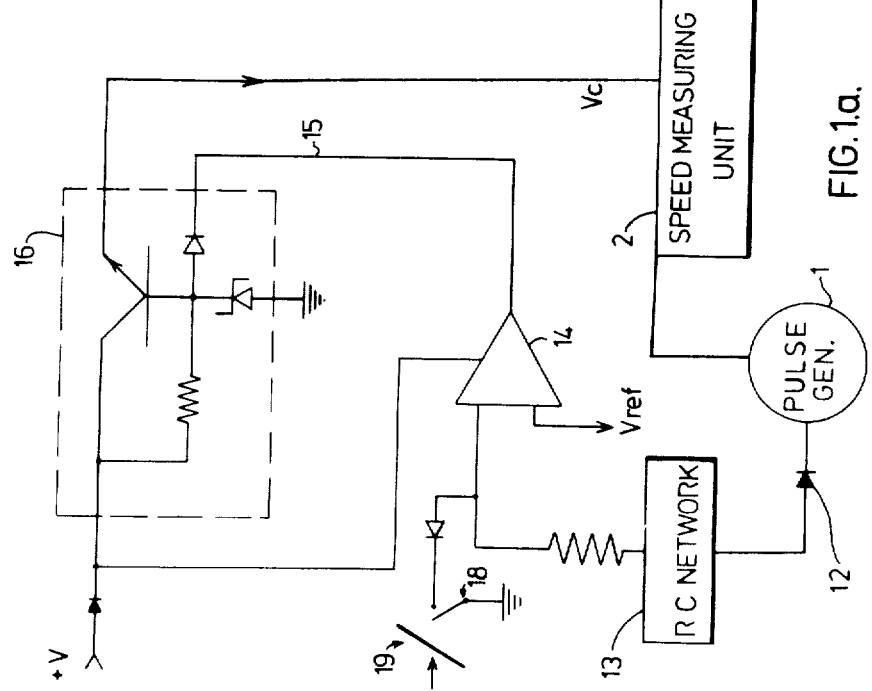
FIG.1a.
FIG.1b.

ACCELERATION WARNING DEVICE

FIELD OF THE INVENTION

This invention relates to an acceleration warning system for use in motor driven vehicles.

BACKGROUND OF THE INVENTION

Motor driven vehicles have considerably more power than that required under normal operating conditions. However these excess power reserves are required for abnormal operating conditions such as high driving speeds and maintaining proper driving speed when negotiating grades. It is also desirable to have additional power reserves to accelerate in traffic situations where lack of available acceleration would otherwise result in an accident.

The availability of this power is however frequently misused to accelerate vehicles from a starting position or from low speeds to higher speeds at excessive rates. This unnecessary acceleration contributes very substantially to the fuel consumption in stop and go or varying speed traffic conditions common to city driving. In some cases the use of the excess power by the driver has resulted in a 25% increase in fuel consumption.

Standard arrangements of vehicle or engine controls and instrumentation are not suitable to overcome this problem. Governors or warning devices for total engine power, engine RPM, engine throttle setting or fuel supply to the engine are unsuitable because they restrict the available power when it is required in the abnormal conditions mentioned above. This also applies to the system in which the engine intake manifold vacuum gauge is used as a simple warning device indicating uneconomical fuel wastage as a result of the vacuum being low due to the throttle being opened too much at low engine RPM.

Acceleration and deceleration measuring or warning devices based on inertia or gravity principals have been proposed for controlling both positive and negative vehicle acceleration. However, due to their very nature, they are inherently disadvantageous due to the fact that they are subject to gravity and as such do not function properly when the vehicle is climbing or descending a grade in the road. Furthermore, because they are essentially mechanical, they are also adversely affected by shocks or vibrations to the vehicle resulting in activation of these inertia and gravity systems under non-acceleration situations.

The present invention overcomes the difficulties of the prior art by providing an acceleration warning system comprising differentiating means for determining the rate of acceleration change of the vehicle and means responsive to a predetermined output of the differentiating means for indicating when the acceleration of the vehicle is beyond a predetermined rate. The system may be used to indicate positive acceleration, negative acceleration or deceleration, or both acceleration and deceleration.

Unlike previous systems, the present invention is strictly dependent upon the acceleration of the vehicle. It therefore permits the use of the power reserves when required in abnormal driving conditions, such as climbing steep grades and pulling heavy loads, since the use of the power reserve under these conditions does not produce an excessive increase in acceleration.

According to an aspect of the invention, the system includes electrical speed measuring apparatus providing a DC voltage proportionate to the speed of the vehicle a differentiation circuit providing a voltage corresponding to the rate of change of vehicle acceleration, and switch means operated by a predetermined output from the differentiator circuit to activate warning and/or control means for warning and/or controlling of excessive acceleration. The switch means may include a first limit switch responding to a first predetermined output voltage from the differentiating circuit relating to positive acceleration and a second limit switch responding to a second predetermined output from the differentiating circuit relating to a negative acceleration or deceleration.

The control means may be in the form of an automatic control activated by the switch means for limiting or restricting the supply of fuel to the engine when the rate of acceleration exceeds a desired or recommended rate. The fuel control is arranged to allow only minimal acceleration and no acceleration whatsoever beyond the recommended rate.

Other advantages and features of the present invention will become apparent from the following description of the preferred embodiments according to this invention, wherein:

FIG. 1a is a schematic showing a preferred arrangement for carrying out the system according to this invention; and FIG. 1b is a graphic illustration of the output of the speed measuring apparatus as the speed of the vehicle increases.

DETAILED DESCRIPTION OF THE PREFERRED EMBODIMENTS

Pulse generating source 1 generates pulses proportionate with and relating to the speed of the vehicle. The pulse generator may be mechanically driven with a rotational speed corresponding to the vehicle speed. It may also be a magnetic pick-up generating pulses corresponding to the rotation of a rotating magnet of a component in the vehicle speed-indicating system. For example, a magnetic pick-up coil suitably located with respect to the magnet of the vehicle's speedometer, is coupled to a source which produces a change in magnetic flux proportionate to the vehicle's speed. The pulses generated from source 1 are therefore used to determine the speed of the vehicle.

In some instances it may be preferable to provide a conventional voltage regulator in the acceleration warning and control system as shown in the upper left portion of FIG. 1 for turning the system on at a predetermined speed, i.e., five or ten miles an hour or so that unavoidable jumps experienced when moving a heavy truck and the like from a standing position cannot inadvertently activate the warning and control devices of the system. With this arrangement the pulses generated by pulse generator are fed to diode 12 and converted to a DC voltage by means of RC network block 13 as known to those skilled in the art. Therefore, a change in frequency from the pulse generator will produce a change in voltage output from the RC network and the resulting voltage output corresponds to the vehicle speed. The output of RC network 13 is fed into a comparator 14, which compares the voltage output to a reference voltage corresponding to a predetermined vehicle speed at which the voltage regulator is switched on. When the output from RC network 13 equals the reference voltage, voltage regulator 16 is turned on through output line 15 of comparator 14. Voltage regulator 16 in turn provides a voltage Vc to a speed measuring unit 2 to activate the system.

The pulses from generator 1 are also fed into the speed measuring unit which is again a frequency to voltage converter. The output of the converter is a voltage which at all times corresponds to the frequency of the pulse input. Therefore, the DC voltage output of the converter which is demonstrated graphically in FIG. 1b has a slope of δV corresponding to the rate of speed change or acceleration of the vehicle.

The voltage output of the speed measuring unit is fed into a differentiating circuit 3. When the vehicle is moving at a constant speed, the input voltage to the circuit remains constant, and circuit 3 provides a constant output voltage as determined by bias voltage V1 shown at 22-1. However, when the input voltage from converter 2 rises, the output from the differentiating circuit is proportionate to the rate of change or slope of the voltage curve from the converter plotted over time. The voltage output of the differentiator is therefore directly proportional to the vehicle acceleration and rises proportionately with positive acceleration and falls proportionately with negative acceleration, or deceleration of the vehicle. The circuit can be set up such that it provides a positive voltage output in reference to V1 relating to acceleration and a negative voltage output relative to V1 corresponding to deceleration.

The differentiating circuit output voltage is amplified in amplifier 4 and fed to voltage comparator switches SW 1 and SW 2. Switch SW 1 switches on when the acceleration exceeds a predetermined rate and the input voltage to the switch exceeds a predetermined reference voltage. Switch SW 2, which may receive a negative voltage, switches on when the deceleration exceeds a predetermined rate. These switches are respectively connected to warning devices 5 and 6 which may be warning lights, buzzers or the like to make the driver aware that the acceleration or deceleration of the vehicle is beyond a desired rate so that the driver can react accordingly.

In cases where further driver control is desired, the system is provided with a measuring device 7, which also receives the amplified output voltage from the differentiator. The measuring device is an analogue meter normally set at the zero position from which the pointer moves to the left corresponding to deceleration and to the right corresponding to acceleration. With suitable calibration this meter can indicate the respective rates of speed change in any desirable units, such as meters/sec$^2$ or in km/hr./sec.

The measuring device can also be a recording type such as that described in copending Canadian patent application Ser. No. 287,369 filed Sept. 23, 1977 for continuously recording acceleration and deceleration as a means of driver control thereby lessening the likelihood of any unnecessary use of the brakes and gas pedal of the vehicle by the driver.

If an additional digital readout is desired, this is achieved by feeding the voltage from amplifier 4 into the analogue to digital converter or interface 11, which in turn controls digital readout 8 showing acceleration as positive digital values and deceleration as minus digital values.

The system may also be used to physically control or limit the acceleration of the vehicle in which case a solenoid operated flow control valve is connected to switch SW 1. Valve 17 can be set up such that the fuel flow is restricted to the amount of fuel required for idling of the engine or for maintaining a very low speed such as 30 km/hr over a level road. With this arrangement, the vehicle is not capable of excessive acceleration and will either maintain its speed or slowly decelerate when switch SW 1 is operated thereby forcing the driver to maintain a desirable rate of acceleration or be faced with an undesirable repeat cycle of acceleration and deceleration.

Another method of restricting the fuel flow to the engine, is to provide servopower means directly into the mechanical linkage of the gas pedal or accelerator. This servopower means would again be operated through switch SW 1 and serves to restrict the operation of the driver controlled fuel control device. This function of reducing the available fuel quantity or fuel mixture for the engine, can be achieved through the use of devices presently used to control the fuel supply in diesel engines or the fuel air mixture in gasoline engines having constant speed controls. These devices interact with the accelerator and reduce the fuel supply or change the fuel mixture independent of the accelerator position chosen by the driver.

In the application of the invention to automatically limit the acceleration of the vehicle, it is desirable to provide an override of the automatic limiting of fuel. This override is required in cases where maximum acceleration is necessary to avoid a collision hazard. A simple manner of incorporating the override in the system is to provide a cut off switch 18 in the linkage of the gas or fuel pedal 19. Cut off switch 18 which is normally open to permit operation of the warning and control system, is closed when the gas or fuel pedal is fully depressed thereby making the system inoperative.

Although the above system has been described such that the various components are responsive to predetermined voltage levels, it will be appreciated that the system can be adapted to react to control signals of varying frequencies, such as the system can be a digital system as opposed to an analogue system.

The system which has been described can be set up as either a warning system or an automatic governing system, when a preset acceleration rate is exceeded. The system when simultaneously designed to warn of excessive deceleration caused by extreme braking, extends its value as an educational aid to the driver to drive the vehicle in a fuel conserving manner. Energy conservation requires that as little as possible energy be lost through braking. Energy conserving driving requires that the driver lets the vehicle roll to a stop as much as possible using its kinetic energy and wind resistance to restrict rolling and to not waste energy by converting it to heat through braking.

The system has been described as including both acoustical and visual warning means, as well as automatic control means. It is to be understood that the warning means could be used independently of the control means and vice versa.

Although various preferred embodiments of the invention have been described herein in detail, variations may be made thereto without departing form the spirit of the invention or the scope of the appended claims.

What I claim is:

1. An acceleration warning and control system for motor driven vehicles having in combination speed measuring apparatus providing an output signal proportionate to and changing with the speed of vehicle, differentiating circuitry providing an output signal corresponding to the rate of change of the output signal from said speed measuring apparatus switch means for indicating an undesirable rate of acceleration and operated by a predetermined output signal from said differentiating circuitry, control warning means activated by said switch means and an activation switch for activating the system, said activation switch being open during initial acceleration from a standing start and closing to activate the system at a predetermined speed such that the system is only operational at speeds equal to and above the predetermined speed.

2. Acceleration warning and control system as defined in claim 1 wherein said control warning means comprises a fuel flow limiting device activated by operation of said switch means to limit the vehicle fuel flow.

3. An acceleration warning and control system as defined in claim 2 including an override controllable by the driver of the vehicle to permit full acceleration when required.

4. An acceleration warning and control system as claimed in claim 1 including servopowered means activated by said switch means to restrict the operation of the driver controlled fuel control device.

5. Acceleration and deceleration warning and control system for motor driven vehicles having in conbination speed measuring apparatus providing an output signal proportionate to and changing with the speed of the vehicle, differentiating circuitry providing an output signal corresponding to the rate of change in the output signal from said speed measuring apparatus, a first switch operated by a first predetermined signal output from said differentiating circuitry indicating unacceptable positive acceleration, a second switch operated by a second predetermined signal output from said differentiating circuitry indicating unacceptable negative acceleration, control warning means activated by said first and second switch and an activation switch for activating the system, said activation switch being open during initial acceleration from a standing start and closing to activate the system at a predetermined speed such that the system is only operational at speeds equal to and above the predetermined speed.

6. Acceleration and deceleration warning and control system as claimed in claim 5 wherein said first and second switches are adjustable to different predetermined signal outputs from the differentiating circuitry.

7. Acceleration and deceleration warning and control system as claimed in claim 5 wherein said speed measuring apparatus provides a DC voltage output proportionate to the speed of the vehicle and said differentiating circuitry provides a voltage corresponding to the rate of change in output voltage from the speed measuring apparatus.

8. Acceleration and deceleration warning and control system as claimed in claim 5 wherein said speed measuring apparatus includes pulse generating means generating pulses of a frequency corresponding to the speed of the vehicle and a frequency to DC voltage convertor providing a DC voltage output proportionate to the pulse frequency of the pulse generating means.

9. Acceleration and deceleration warning and control system as claimed in claim 8 wherein said pulse generating means comprises a magnetic pick-up device generating pulses corresponding to the rotation of a rotating magnet in the vehicle speed indicating system.

10. Acceleration and deceleration warning and control systems as defined in claim 7, wherein said first predetermined signal output is a positive voltage and said second predetermined signal output is negative voltage in reference to a predetermined bias voltage.

* * * * *